(12) United States Patent
Van Kleef

(10) Patent No.: US 11,008,176 B1
(45) Date of Patent: May 18, 2021

(54) SLIP ROLLER CONVEYOR

(71) Applicant: Bohnert Equipment Company, Inc., Louisville, KY (US)

(72) Inventor: Ericus Andreas Van Kleef, Simpsonville, KY (US)

( * ) Notice: Subject to any disclaimer, the term of this patent is extended or adjusted under 35 U.S.C. 154(b) by 0 days.

(21) Appl. No.: 16/782,370

(22) Filed: Feb. 5, 2020

Related U.S. Application Data

(60) Provisional application No. 62/803,083, filed on Feb. 8, 2019.

(51) Int. Cl.
| | | |
|---|---|---|
| *B65G 39/07* | (2006.01) | |
| *B65G 13/02* | (2006.01) | |
| *B65G 39/12* | (2006.01) | |
| *B65G 13/06* | (2006.01) | |

(52) U.S. Cl.
CPC ............ *B65G 39/07* (2013.01); *B65G 13/02* (2013.01); *B65G 13/06* (2013.01); *B65G 39/12* (2013.01); *B65G 2201/0241* (2013.01)

(58) Field of Classification Search
CPC .. B65G 47/261; B65G 47/263; B65G 47/266; B65G 13/073; B65G 13/06; B65G 13/07; B65G 13/071; B65G 39/07; B65G 39/09; B65G 39/12
USPC ...................................... 198/781.01–781.03
See application file for complete search history.

(56) References Cited

U.S. PATENT DOCUMENTS

| | | | | |
|---|---|---|---|---|
| 4,266,660 A | * | 5/1981 | Herman ............... | B65G 47/261 198/781.02 |
| 4,325,474 A | * | 4/1982 | Rae ..................... | B65G 47/261 198/781.02 |
| 5,161,673 A | * | 11/1992 | Cairns .................... | B65G 13/07 198/781.04 |
| 5,558,206 A | * | 9/1996 | Helgerson .............. | B65G 13/07 193/37 |
| 6,581,759 B1 | * | 6/2003 | Kalm ..................... | B65G 13/11 193/35 R |
| 6,820,736 B2 | * | 11/2004 | Itoh ........................ | B65G 39/02 198/780 |
| 7,090,064 B2 | * | 8/2006 | Lutz ....................... | B65G 1/023 193/35 R |
| 7,850,000 B2 | * | 12/2010 | Andreoli ............ | B65G 21/2054 198/836.1 |
| 8,607,965 B2 | * | 12/2013 | Sejourne .............. | B65G 13/075 198/534 |
| 8,763,788 B2 | * | 7/2014 | Neiser .................. | B65G 47/268 198/781.01 |
| 2004/0050670 A1 | * | 3/2004 | Davis ..................... | B65G 39/04 198/780 |
| 2006/0180426 A1 | * | 8/2006 | Scott ...................... | B65G 39/02 193/37 |

* cited by examiner

*Primary Examiner* — Mark A Deuble
(74) *Attorney, Agent, or Firm* — Gary K. Price

(57) ABSTRACT

A slip roller conveyor utilizes slip rollers constructed of an interior sleeve formed of a relatively lower friction material combined with an exterior sleeve formed of a relatively more durable material that has relatively greater resistance to damage or wear, e.g., as may be caused by barrels or other abrasive objects to be conveyed.

15 Claims, 3 Drawing Sheets

SLIP ROLLER CONVEYOR

BACKGROUND

Barrel production in a cooperage includes numerous steps, stations, and machinery to produce a wooden barrel, as well as various material handling steps and machinery to convey barrels and barrel components. In many instances, individual conveyor systems are required to convey barrels between individual stations, and the conveyor systems are required to frequently start and stop to enable barrels to be appropriately staged for subsequent operations, or to incorporate multiple zones that can be driven independently from one another to coordinate the movement of barrels between stations. The use of multiple conveyor systems and/or zones, however, can be expensive and complex to implement. Moreover, such conveyor systems generally must utilize metal rollers or other heavy duty components due to the abrasiveness, sharp edges, protrusions, etc. of barrels and/or barrel components conveyed on the rollers.

Accumulation conveyor systems, on the other hand, often simplify material handling in other applications as such conveyor systems provide an ability to run continuously while accumulating or holding back multiple conveyed objects until needed by a downstream process. One type of accumulation conveyor system utilizes slip rollers, whereby sleeves of a relatively low friction material such as a thermoplastic polymer (e.g., polyethylene, polystyrene, polyamide, etc.) are installed upon conventional chain or belt-driven rollers that run continuously. In the absence of an obstruction, the weight of a conveyed object supported by the slip roller will generate sufficient friction between the polymer sleeves and the driven rollers to also drive the polymer sleeves and propel the object(s) along the conveyor. However, upon encountering an obstructing force such as an obstruction or barrier introduced into the path of the conveyed object, the obstructing force will be sufficient to halt the progress of the conveyed object such that the polymer sleeves slip on the driven rollers and the conveyed object remains in place on the conveyor. In some instances, the obstruction may be an "escapement", such that where one or more objects are accumulated the "escapement" obstruction will allow only one object to be released at a time.

While slip rollers have been found to be useful in many situations, the thermoplastic polymers utilized in such designs are generally unsuitable for use in conveying barrels and barrel components, as these thermoplastic polymer materials are generally unable to tolerate the abrasiveness, sharp edges, protrusions, etc. of barrels and barrel components. As such, a need exists in the art for an accumulation conveyor system capable of efficiently and economically conveying barrels and other abrasive objects.

SUMMARY

The invention addresses these and other problems associated with the art by providing a durable slip roller solution for the transportation of abrasive barrels and barrel components that enhances efficiency and provides a simple and economical solution for conveying barrels and/or barrel components between stations within a cooperage.

Therefore, consistent with one aspect of the invention, a roller conveyor for barrels may include a frame, a plurality of driven rollers arranged for conveyance of a barrel supported by the frame, a conveyor drive configured to rotate the plurality of driven rollers, and a plurality of slip rollers circumscribing the plurality of driven rollers. Each slip roller may include an exterior sleeve having a durable exterior surface and configured to slip in rotation relative to the one of the driven rollers circumscribed by the slip roller in response to an obstructing force on a barrel supported by the slip roller.

In some embodiments, the exterior sleeve is formed of a first material, and the slip roller further includes an interior sleeve defining an interior surface of the slip roller and formed of a second material. Moreover, in some embodiments, the second material is a thermoplastic polymer, and in some embodiments, the second material is a polyethylene. In some embodiments, the first material is a durable metal, and in some embodiments, the first material is stainless steel.

In addition, some embodiments may further include one or more end pieces, each end piece having a plurality of openings sized and configured to receive ends of the plurality of driven rollers while limiting transverse movement of the plurality of slip rollers. Moreover, in some embodiments, the one or more end pieces are constructed of a thermoplastic polymer.

Some embodiments may further include a conveyor drive configured to drive the plurality of driven rollers. Some embodiments may also include a stop configured to allow for accumulation of one or more barrels on the roller conveyor. Also, in some embodiments, the plurality of rollers are arranged into one or more zones.

Consistent with another aspect of the invention, a slip roller configured to circumscribe a driven roller of a roller conveyor may include an interior sleeve comprised of a first material and an exterior sleeve comprised of a second material, and the slip roller may be configured to slip in rotation relative to the driven roller in response to an obstructing force on the object supported by the slip roller.

Further, in some embodiments, the first material is a thermoplastic polymer, and in some embodiments, the first material is polyethylene. Also, in some embodiments, the second material is a durable metal, and in some embodiments, the second material is stainless steel.

Consistent with another aspect of the invention, a roller conveyor may include a frame, a plurality of driven rollers arranged for conveyance of an object supported by the frame, a conveyor drive configured to rotate the plurality of driven rollers, and a plurality of slip rollers circumscribing the plurality of driven rollers, each slip roller configured to slip in rotation relative to the one of the plurality of driven rollers circumscribed by the slip roller in response to an obstructing force on a barrel supported by the slip roller, and each slip roller may include an interior sleeve defining an interior surface of the slip roller and comprised of a thermoplastic material, and an exterior sleeve defining an exterior surface of the slip roller and comprised of a durable metal.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Embodiments consistent with the invention are generally directed to various aspects of a slip roller for conveying barrels or other abrasive objects. Such a slip roller may include an interior sleeve, which defines an interior surface of the slip roller and is formed of a thermoplastic polymer or other relatively low friction material, that is fit within an exterior sleeve, which defines an exterior surface of the slip roller and formed of a more durable and wear-resistant material such as stainless steel or other suitably durable material. Although described herein with respect to conveying barrels through a cooperage, the invention is not so limited, as the slip rollers and conveyor described herein may be used in other conveying operations where the objects being conveyed are abrasive or would otherwise cause excessive damage and/or wear to conventional slip roller materials. The herein-described slip rollers, for example, are suitable for use with numerous commercially-available chain driven live roller (CDLR) conveyor systems.

Figure 1:
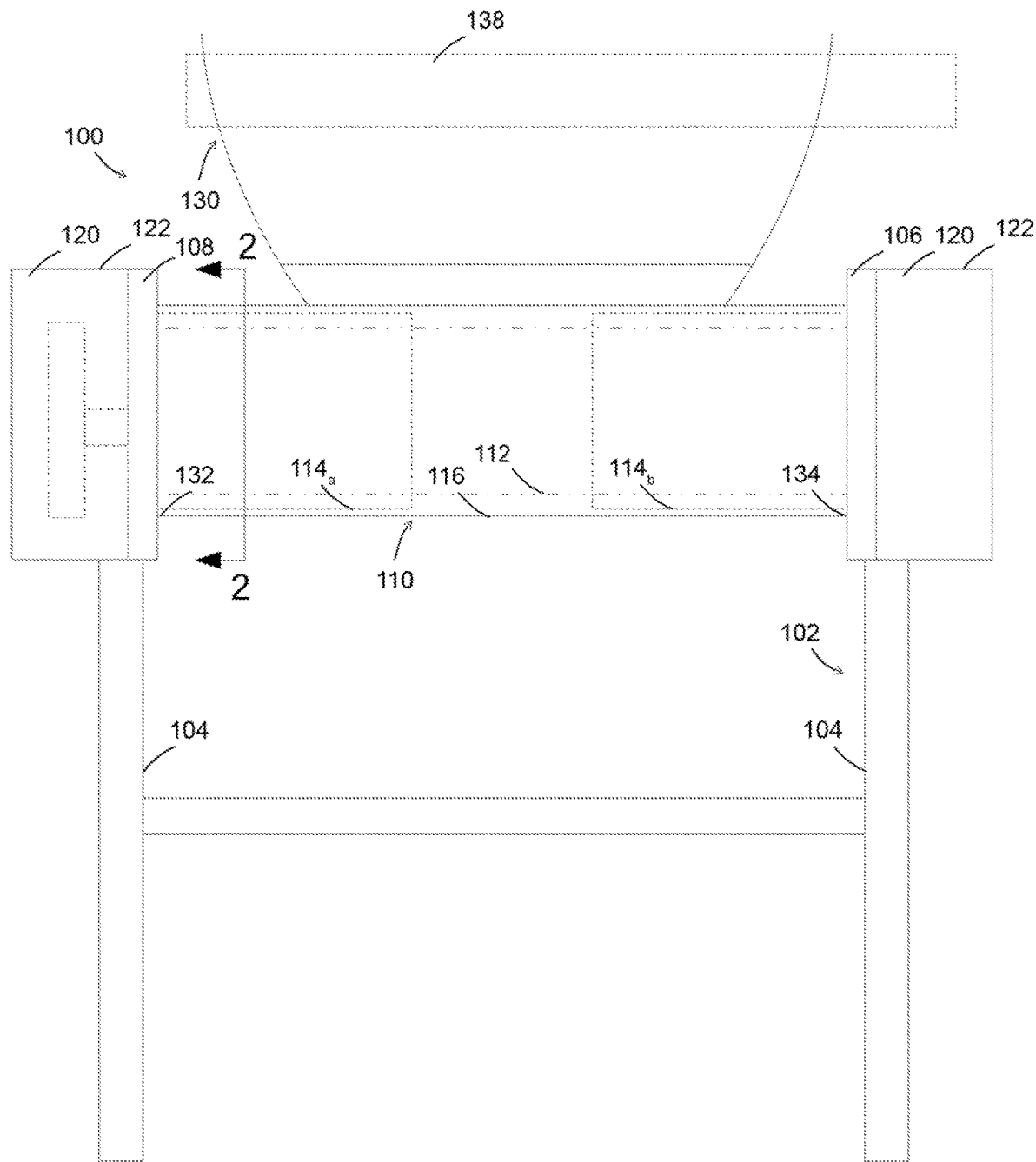
FIG. 1 is a schematic end view of a roller conveyor consistent with some embodiments of the invention.

FIG. 1, for example, illustrates a schematic end view of a roller conveyor 100 consistent with some aspects of the invention. The roller conveyor 100 includes a frame 102 for supporting the conveyor 100. Such a frame 102 is not limited to the illustration of FIG. 1, and may take on any number supporting structures known in the art. For example, the frame 102 may include one or more legs or bracing 104 repeated at a defined distance along the conveyor. In some instances, the frame 102 may include cross-bracing for additional support and alignment. In other embodiments, the frame may include ceiling hangers for positioning the roller conveyor 100 from the ceiling, as opposed to the floor.

A single roller assembly 110 at the end of a roller conveyor 100 is illustrated in FIG. 1. Each roller assembly 110 may include a driven roller 112 (illustrated in the dot dot dash broken line) circumscribed by a slip roller 114, 116. In some embodiments, such as illustrated in FIG. 1, the slip roller may include two concentric portions described in detail herein: an interior sleeve 114 (illustrated in broken line) that defines an interior surface of the slip roller, and an exterior sleeve 116 that defines a durable exterior surface of the slip roller. The sleeves 114, 116 that form the slip roller may be configured to slip in rotation relative to driven roller 112 in response to an obstructing force, for example a physical stop 138 along the conveyor 100, on the object being conveyed and supported by the slip roller, such as a barrel 130. For example, the slip roller may slip when the force obstructing the movement of the barrel (or other object being conveyed) exceeds the friction force effectuating the rotation of the slip roller 114, 116 in response to rotation of driven roller 112. This allows for the accumulation of objects being conveyed, which may be desirable before or after a sortation system, a merge of conveying lines, the end of a conveying line, etc. Such accumulation may allow for higher throughput rates and smoother flow of the barrels or other objects being conveyed.

The roller conveyor 100 also includes side rails 122 that extend alongside the roller assemblies 110 and at a higher elevation thereto to assist with guiding objects as they are conveyed along the conveyor, and in some instances, prevent objects from falling off of the side of the conveyor. In the illustrated embodiment, the roller conveyor 100 may additionally include one or more end stops or pieces 106, 108 that extend along the side rails 122 to limit transverse movement motion of the slip roller 114, 116 on the driven roller 112 (i.e., to limit movement of the slip roller in an axial direction relative to the driven roller), while still enabling driven roller 112 to extend through side rails 122 to provide support for each end of the driven roller as well as a mechanical coupling to a conveyor drive. The roller conveyor 100 may also include a conveyor drive 120 (e.g., a belt or chain-driven drive) that powers the rotation of the driven rollers 112. In some embodiments, the conveyor drive 120 may include a motor and/or a drive belt, while in other embodiments the conveyor drive 120 may include a power transmission mechanism, such as a chain drive and one or more sprockets for powering the driven rollers 112.

Figure 2:
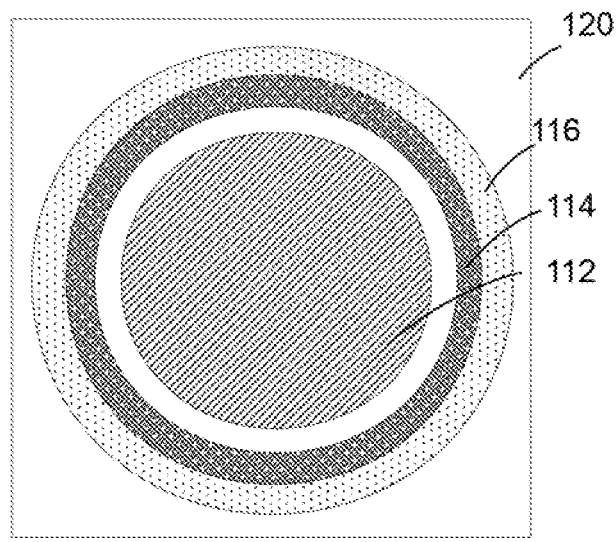
FIG. 2 is a schematic cross-sectional view taken on line 2-2 of FIG. 1.

In some instances, the interior sleeve 114 may be constructed of a relatively thin polymer material, and as such attempting to press fit a full length interior sleeve 114 of such material into the exterior sleeve 116 may result in collapse; therefore, in some embodiments, the interior sleeve may be constructed of two portions 114a and 114b. Each portion of the interior sleeve 114a, 114b may extend from a first end 132 or a second end 134 of the roller assembly 110 towards the middle, such as illustrated in FIG. 1. As a non-limiting example, in some embodiments, each portion of the interior sleeve 114a, 114b may be about 11⅞ inches long, while the exterior sleeve 116 may be about 26⅞ inches long. In other embodiments, however, the interior sleeve 114 may extend the entire length of the exterior sleeve 116. Referring now to FIG. 2, which is a cross-sectional view of taken on line 2-2 of FIG. 1, the interior of the roller assembly 110 is illustrated. The driven roller 112 is shaded to indicate it may be of a solid construction; however, this is not intended to be limiting (see FIG. 5). As described herein, the sleeves 114, 116 circumscribing the driven roller 112 comprise the slip roller. In some instances, the two portions comprising the slip roller, the interior sleeve 114 and the exterior sleeve 116 may be press fit together and have respective outer and inner diameters selected to prevent relative movement therebetween, as illustrated in FIG. 2. The inner diameter of the interior sleeve 114, however, may be selected to be somewhat larger than the outer diameter of driven roller 112 (as denoted by the lack of shading in FIG. 2 between driven roller 112 and interior sleeve 114) to allow for the slip roller to slip relative to driven roller 112 (e.g., stop moving while driven roller 112 continues to rotate) when there is a force obstructing movement of the object being conveyed that exceeds the friction force effectuating the rotation of the slip roller 114, 116 by the driven roller 112. The interior sleeve 114 and exterior sleeve 116 may be constructed of different materials with differing surface hardness, durability, and frictional forces. For example, the interior sleeve 114 may be constructed of a thermoplastic polymer or other suitable relatively lower friction material, which is an easily moldable plastic material that is pliable above a specific temperature and solidifies to a hard surface upon cooling. In some instances, the thermoplastic polymer may be a polyethylene, which includes a number of similar thermoplastics categorized by their density and molecular structure, including ultra-high-molecular-weight polyethylene (UHMWPE), high-density polyethylene (HDPE), medium-density polyethylene (MDPE), or low-density polyethylene (LDPE). The exterior sleeve 116, in contrast, may be constructed of a hard, durable metal or other material. In some instances, the hard, durable material may be abrasion resistant and/or be more resistant to abrasion than thermoplastic polymers, in particular than polyethylene. For example, in some instances, the exterior sleeve 116 may be constructed of steel (e.g. stainless steel, maraging steel, etc.), aluminum, titanium, tungsten, etc., or alloys of the same. As an non-limiting example an approximately 12 inches long interior sleeves may be constructed from a standard five foot extruded stick of UHMWPE, allowing for multiple interior sleeves to be constructed without waste. In such an example, the interior sleeves 114 may be press fit into steel tubes without preparatory machining, honing, or boring of the steel tubes, one interior sleeve from each side.

Figure 3:
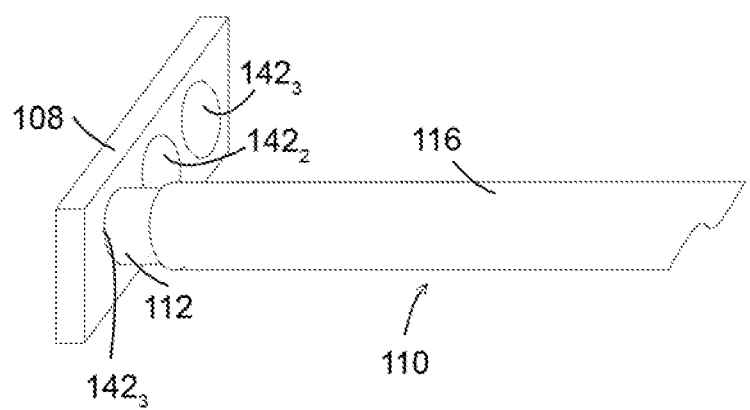
FIG. 3 is a partial perspective view of a roller assembly and end stop consistent with some embodiments of the invention.

Referring now to FIG. 3, this figure is a partial perspective view illustrating a non-limiting example of how an end stop or piece 108 may receive the driven roller 112 of the roller assembly 110 while limiting transverse movement of the slip roller 114, 116. As illustrated, the end stop or piece 108 may include one or more openings 1421-n, each of which may be sized to receive the driven roller 112 portion of the roller assembly 110, while restricting transverse movement of the slip roller 114, 116. The length of the end piece 108, and number of openings may vary. This end piece 108 in combination with another end piece at the opposing end of the driven roller 112 (not illustrated in FIG. 3; see 106 in FIG. 1) allow the slip roller 114, 116 to "float" between the end portions 106, 108. In some embodiments, these end pieces 106, 108 may be constructed of a thermoplastic polymer or another suitable relative low friction surface to limit wear on interior sleeve 114 when the slip roller abuts the end piece.

Figure 4:
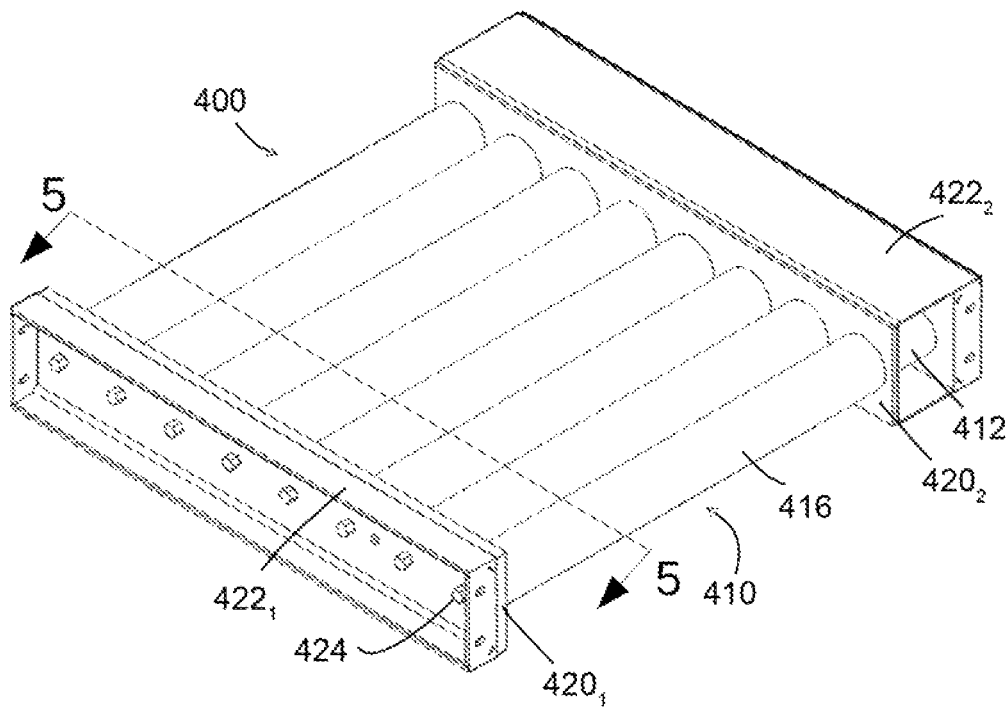
FIG. 4 is a perspective view of a roller conveyor consistent with some embodiments of the invention.
Figure 5:
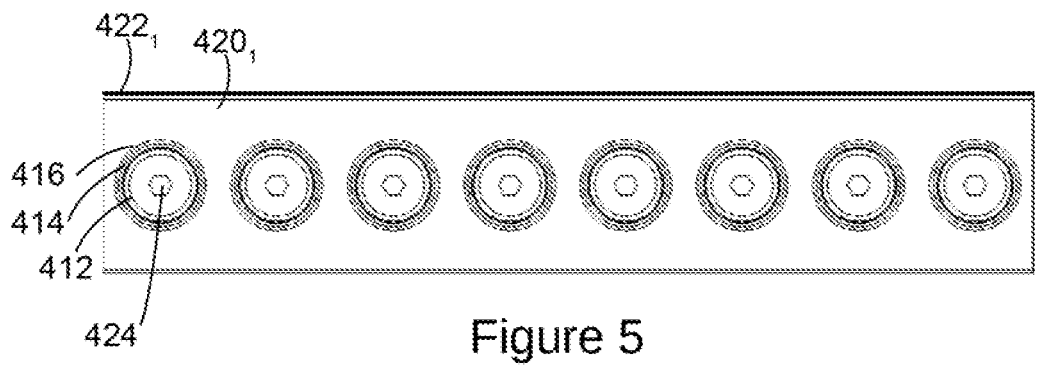
FIG. 5 is a cross-sectional view taken on line 5-5 of FIG. 4.
Figure 6:
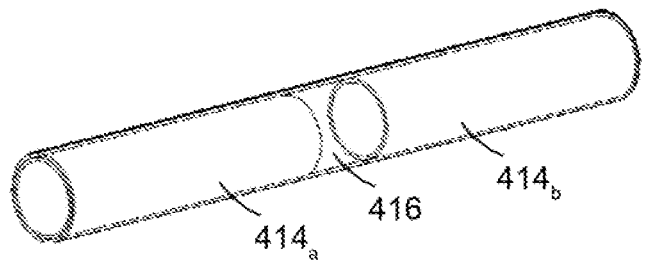
FIG. 6 is a perspective view of a slip roller of FIG. 4.

FIGS. 4-6 illustrate another embodiment of a roller conveyor 400 including a plurality of roller assemblies 410, each including a driven roller 412 and a slip roller having an interior sleeve 414 and an exterior sleeve 416, a first end piece 4201 and a second end piece 4202 that receive the driven roller 412, and a first side frame 4221 and a second side frame 4222 to support the conveyor 400. Similar to the schematic of FIG. 3, each end piece 4201, 4202 may include openings (not visible in FIG. 4), each of which may be sized to receive a driven roller 412 while restricting transverse movement of a slip roller. In some instances, such as illustrated in FIG. 4, the driven roller 412 may extend through the end piece 4201, 4202 into the side frame 4221, 4221 where it may be secured by a pin 424, peg, bolt, or any other type of attachment mechanism allowing rotation known in the art, as well as to mechanically couple to a conveyor drive (not shown in FIG. 4). As discussed previously, these end pieces 4201, 4202 may allow the slip roller 414, 416, only the exterior sleeve 416 of which is visible in FIG. 4, to "float" between the end portions 4201, 4202 within any additional mechanical attachment. In some embodiments, such as illustrated in FIG. 5, the driven roller 412 may be hollow. As described previously, the driven roller 412 may be circumscribed by a slip roller that includes an interior "soft" sleeve 414 having a relatively lower coefficient of friction and an exterior "hard" sleeve 416 having a relatively greater durability as described herein. FIG. 6 further illustrates the relationship between the interior sleeve 414a, 414b and the exterior sleeve 416 in some embodiments of the invention. As illustrated, the interior sleeve includes two portions 414a and 414b, each of which is nested and/or press fit into the exterior sleeve 416.

Although not illustrated in FIGS. 1-6, it is to be understood that the conveyor 100, 400 pathways may include any number of additional components such as one or more turning wheels, docking or sorting stations, etc. where some various operations may be performed on the object being conveyed (e.g. a barrel). The conveyor 100, 400 may also include one or more zones that may each be individually driven by a conveyor driver (e.g. a motor). As an example, in some instances these zones may function as a buffer zone to hold the objects being conveyed under the various downstream operations have capacity available to handle them, allowing the objects to queue before moving forward.

It will be appreciated that the herein-described embodiments may be used, for example, to convey abrasive articles such as wooden barrels and barrel components, and may, in some embodiments, provide accumulation functionality on a standard commercially-available CDLR conveyor system in an economical and efficient manner. This is in contrast to conventional slip rollers, which have been found to be generally incapable of reliably conveying and accumulating barrels when installed on standard commercially-available CDLR conveyor systems.

Various additional modifications may be made to the illustrated embodiments consistent with the invention. Therefore, the invention lies in the claims hereinafter appended.

What is claimed is:

1. A roller conveyor for barrels comprising:
    a frame;
    a plurality of roller assemblies, and wherein each of the plurality of roller assemblies include a driven rollers arranged for conveyance of a barrel supported by the frame;
    a conveyor drive configured to rotate each of the driven rollers; and
    wherein each of the roller assemblies further include a slip rollers circumscribing the driven rollers, each slip roller including an exterior sleeve having a durable exterior surface and configured to slip in rotation relative to the driven rollers circumscribed by the slip roller in response to an obstructing force on a barrel supported by the slip roller, and wherein each of the plurality of roller assemblies include a first end and a second, opposite end, and the first end defines a first diameter equal to a diameter of said second, opposite end, and said first diameter is less than a second diameter of said slip roller;
    one or more end pieces, each end piece having a plurality of openings sized and configured to receive the first diameter of said first and second ends and sized to not receive the second diameter of said slip roller thereby limiting transverse movement of the slip roller; and,
    wherein the slip roller further includes an interior sleeve having an inner diameter that is greater than an outer diameter of the driven roller defining a spacing therebetween.

2. The roller conveyor of claim 1, wherein the exterior sleeve is comprised of a first material, and wherein the interior sleeve defining an interior surface of the slip roller and comprised of a second material.

3. The roller conveyor of claim 2, wherein the second material is a thermoplastic polymer.

4. The roller conveyor of claim 3, wherein the second material is a polyethylene.

5. The roller conveyor of claim 2, wherein the first material is a durable metal.

6. The roller conveyor of claim 5, wherein the first material is stainless steel.

7. The roller conveyor of claim 1, wherein the one or more end pieces are constructed of a thermoplastic polymer.

8. The roller conveyor of claim 1, further comprising a stop configured to allow for accumulation of one or more barrels on the roller conveyor.

9. The roller conveyor of claim 1, wherein the plurality of rollers assemblies are arranged into one or more zones.

10. A slip roller configured to circumscribe a driven roller of a roller conveyor, the slip roller comprising:
   an interior sleeve comprised of a first material;
   an exterior sleeve comprised of a second material;
      wherein an inner diameter of the interior sleeve is greater than an outer diameter of the driven roller defining a spacing therebetween;
   wherein the roller conveyer includes one or more end pieces, each end piece having a plurality of openings sized and configured to receive ends of the driven roller and sized so that the slip roller cannot pass through the openings; and
   wherein the slip roller is configured to slip in rotation relative to the driven roller in response to an obstructing force on the object supported by the slip roller.

11. The slip roller of claim 10, wherein the first material is a thermoplastic polymer.

12. The slip roller of claim 11, wherein the first material is polyethylene.

13. The slip roller of claim 10, wherein the second material is a durable metal.

14. The slip roller of claim 13, wherein the second material is stainless steel.

15. A roller conveyor comprising:
   a frame;
   a plurality of driven rollers arranged for conveyance of an object supported by the frame;
   a conveyor drive configured to rotate the plurality of driven rollers;
   a plurality of slip rollers circumscribing the plurality of driven rollers, each slip roller configured to slip in rotation relative to one of the plurality of driven rollers circumscribed by the slip roller in response to an obstructing force on a barrel supported by the slip roller; and
   wherein each slip roller comprises:
      an interior sleeve defining an interior surface of the slip roller and comprised of a thermoplastic material,
      an exterior sleeve defining an exterior surface of the slip roller and comprised of a durable metal, and wherein the interior sleeve having a diameter that is greater than an outer diameter of each of the driven rollers defining a spacing therebetween;
   one or more end pieces, each end piece having at least one opening sized and configured to receive ends of the plurality of driven rollers but having a diameter too small to receive the slip roller.

* * * * *